United States Patent Office 3,641,087
Patented Feb. 8, 1972

3,641,087
PREPARATION OF BROMINATED SILANE
DERIVATIVES
Donald John Holman, Wedhey, Harlow, England,
assignor to Berk Limited
No Drawing. Filed Oct. 4, 1968, Ser. No. 765,005
Claims priority, application Great Britain, Oct. 18, 1967,
47,455/67
Int. Cl. C07f 7/06, 7/18
U.S. Cl. 260—448.8 R                                       6 Claims

ABSTRACT OF THE DISCLOSURE

This invention is concerned with the preparation of certain brominated silane derivatives which have a variety of useful properties including, in particular, the ability to impart fire retardant properties to synthetic polymer compositions in which they are incorporated.

---

According to the present invention we provide a process for the preparation of a brominated silane of formula $$R_nSi(OC_6Br_5)_{4-n} \qquad (I)$$

where R is an alkyl group containing from 1 to 6 carbon atoms and $n$ is 0, 1, 2 or 3 ($OC_6Br_5$ is, of course, the pentabromophenoxy group), which comprises condensing pentabromophenol with an alkylchlorosilane of the formula $R_nSiCl_{4-n}$, using substantially $(4-n)$ mols of pentabromophenol per mol of alkylchlorosilane, in the presence of a suitable base (as hereinafter defined), as acid binding agent, and an inert organic solvent. Suitable bases for this purpose are anhydrous ammonia (provided that it is adequately soluble in the organic solvent used), primary and secondary aliphatic and aromatic amines and their corresponding amides. The preferred bases are those which do not have a replaceable hydrogen atom attached to the nitrogen atom. The best yields are obtained with dialkyl amides, such as dimethyl and diethyl formamide, and diethyl and dimethyl acetamide; other suitable bases are N-phenyl-N-methyl formamide and diphenylformamide.

The reaction is preferably carried out at an elevated temperature up to the boiling point of the reaction mixture. Suitable inert solvents are, for example, benzene and toluene.

When the base used in the procss does not contain a replaceable hydrogen atom attached to a nitrogen atom, the base functions solely as an acid binding agent and the process of the invention may be illustrated as follows:

$$R_nSiCl_{4-n} + (4-n)C_6Br_5OH + (4-n)\text{base} \rightarrow$$
$$R_nSi(OC_6Br_5)_{4-n} + (4-n)[\text{base.HCl}]$$

When, however, the base used does contain a replaceable hydrogen atom attached to a nitrogen atom, the base not only functions as an acid binding agent but also reacts with the alkylchlorosilane to form, as an intermediate product, an alkylaminosilane. For example, when diethylamine is used as the base, the reaction proceeds in two stages which may be illustrated as follows:

(1) $R_nSiCl_{4-n} + 2(4-n)HNEt_2 \rightarrow$
$$R_nSi(NEt_2)_{4-n} + (4-n)HNEt_2.HCl$$

(2) $R_nSi(NEt_2)_{4-n} + (4-n)C_6Br_5OH \rightarrow$
$$R_nSi(OC_6Br_5)_{4-n} + (4-n)HNEt_2$$

When ammonia is used as the base, alkylaminosilylamines of the formula

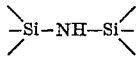

are formed in Step 1.

It is convenient when using a base which contains a replaceable hydrogen atom attached to a nitrogen atom to carry out the process in two stages corresponding to Stages 1 and 2 illustrated above.

Thus the invention includes, as a modification of the process first described, a process for preparing the compounds of Formula I wherein the alkylchlorosilane is first condensed with anhydrous ammonia or a primary or secondary aliphatic or aromatic amine, using substantially $2(4-n)$ moles of the base per mole of alkylchlorosilane, in the presence of an inert organic solvent in which the base is adequately soluble, and the alkylaminosilane obtained is then condensed with substantially $(4-n)$ mols of pentabromophenol, per mol of alkylaminosilane in the presence of an inert organic solvent.

The preferred base for use in the first stage of this process is diethylamine. Both stages of the process are preferably carried out at an elevated temperature up to the boiling point of the reaction mixture. Suitable inert solvents are, for example, benzene and toluene.

The compounds of Formula I in which $n$ is 3 are novel and constitute a further aspect of the present invention.

A particular advantage of the compounds of Formula I as fire retardant additives for polymer compositions is that they remain stable, unlike many of the currently available fire retardants for plastics, at elevated temperatures of up to 300° C. The compounds of Formula I are advantageously used, therefore, as fire retardant additives in polymer compositions which are processed, for example extruded, at high temperatures and/or are subjected to high temperatures in use.

In order that the invention may be more fully understood, the following Examples 1–9 showing the preparation of compounds of Formula I are given by way of illustration only:

EXAMPLE 1

Preparation of trimethyl-pentabromophenoxy-silane

Trimethyl-chloro-silane (10.8 g., 0.05 mole) was added to a mixture of pentabromophenol (24.5 g., 0.05 mole) and dimethyl formamide (2 ml.) in toluene (100 ml.) and the mixture was refluxed for 24 hr. Towards the end of the reaction a further portion (1 ml.) of dimethyl formamide was added. The solvent was removed under vacuum, leaving a pale buff solid (18.1 g., 64.1%) M.P. 195° C. (Found: Br. 70.6%, $C_{10}H_{12}NOBr_5$ requires: Br. 71.2%).

$$(CH_3)_3SiCl + C_6Br_5OH \rightarrow (CH_3)_3Si(OC_6Br_5) + HCl$$

EXAMPLE 2

Preparation of methyl-tris(pentabromophenoxy)silane

Methyl-trichloro-silane (2.98 g., 0.02 mole) was added to pentabromophenol (29.2 g., 0.06 mole) in toluene (200 ml.). Dimethyl formamide (1 ml.) was added and the mixture refluxed for 6 hr., at which time 97% reaction (by HCl titration) has occurred. A white solid was separated and identified as methyl-tris(pentabromophenoxy)-silane (26.0 g., 80%) M.P. 256° C. Found: Br. 78.5%, $C_{19}H_3Br_{15}O_3Si$ requires Br. 79.9%.

$$CH_3SiCl_3 + 3C_6Br_5OH \rightarrow CH_3Si(OC_6Br_5)_3 + 3HCl$$

EXAMPLE 3

Preparation of tetra(pentabromophenoxy)-silane

Silicon tetrachloride (17.0 g., 0.1 mole) was added at room temperature to pentabromophenol (198.4 g., 0.4 mole) in toluene (500 ml.) and refluxed in the presence of dimethyl formamide (5 ml.) for 12 hr. A second portion of dimethyl formamide (5 ml.) was added after four hours. A white solid, insoluble in toluene, stable to water, dilute acid and strong alkali, was isolated and identified as tetra(pentabromophenoxy)silane, M.P. 365° C. (dec.). Found: Br. 79.9%, $C_{24}Br_{20}O_4Si$ requires: Br. 80.3%). Yield 186 g. (95%); hydrogen chloride, determined by titration, showed 98.5% reaction.

$$SiCl_4 + 4C_6Br_5OH \rightarrow Si(OC_6Br_5)_4 + 4HCl$$

The preparation was repeated four times with similar results. A qualitative determination of the rate of evolution of HCl (i.e. the rate of substitution of chlorine for pentabromophenoxy) gave the following results:

$$SiCl_4 + Br_5C_6OH \rightarrow SiCl_3(OC_6Br_5) + HCl\text{—15–30 mins.}$$

$$SiCl_3(OC_6Br_5) + Br_5C_6OH$$
$$\rightarrow SiCl_2(OC_6Br_5)_2 + HCl\text{—15–30 mins.}$$

$$SiCl_2(OC_6Br_5)_2 + Br_5C_6OH$$
$$\rightarrow CiCl(OC_6Br_5)_3 + HCl\text{—1–1½ hr.}$$

$$*SiCl(OC_6Br_5)_3 + Br_5C_6OH$$
$$\rightarrow Si(OC_6Br_5)_4 + HCl\text{—5–7 hr.}$$

*Addition of a further portion of dimethyl formamide.

The rate of sublimation of the compound of this example, tetra(pentabromophenoxy) - silane (4(5BP)Si), was determined by heating a 5 g. sample of the compound in a crucible in a constant temperature oven at 250° C. The loss in weight and appearance of the sample were recorded after 1, 3 and 20 hours. The results obtained were as follows:

Compound.—4(5BP)Si

| Loss in weight at 250° C. after— | Percent |
|---|---|
| 1 hour | [1] 6.8 |
| 3 hours | [1] 7.5 |
| 20 hours | [1] 9.5 |

[1] Slight decomposition.

EXAMPLE 4

Pentabromophenol (100 g., 0.205 mole) was treated with silicon tetrachloride (9.3 g., 0.05 mole) and diethylformamide (25 ml.) for 16 hours in refluxing toluene. The white product was filtered, dried and identified as tetra(pentabromophenoxy) silane. Yield: 34 g. (35%) M.P. 363°. (Found: Br, 78.8%; calculated, for $C_{24}O_4Br_{20}Si$, Br. 80%.)

EXAMPLE 5

Pentabromophenol (100 g., 0.205 mole) was treated with silicon tetrachloride (0.3 g., 0.05 mole) and methylphenylformamide (N-methylformanilide) (25 ml.) in refluxing toluene (300 ml.) for 16 hours. The blue coloured product was identified as tetra(pentabromophenoxy) silane M.P. 355–360°. Yield: 58 g. (58%). (Found: Br. 78%. Calculated, for $C_{24}O_4Br_{20}Si$, Br. 80%.)

EXAMPLE 6

Pentabromophenol (100 g., 0.205 mole) was treated with silicon tetrachloride (9.3 g., 0.05 mole) and diphenylformamide (10 g.) in toluene (300 ml.) and was refluxed for 20 hours at 112°. The product was isolated as a dark green solid which proved to be impure tetra(pentabromophenoxy)-silane, yield 26 g. (26%). The product proved difficult to purify, but after successive solvent extractions, it retained its colour and had a melting point of 345–355°. (Found: Br. 76.3%. Calculated, for $C_{24}Br_{20}O_4Si$, Br. 80.0%.)

EXAMPLE 7

Pentabromophenol (100 g., 0.205 mole) was treated with silicon tetrachloride (9.3 g., 0.2 mole) and dimethylacetamide (30 ml.) in toluene (300 ml.) and refluxed for 16 hours at 110°. The solid product was identified as tetra(pentabromophenoxy) silane and was isolated as a white solid M.P. 355–360° yield 53 g. (54%). (Found: Br. 79.4%. Calculated, for $C_{24}Br_{20}O_4Si$, Br, 80%.

EXAMPLE 8

Preparation of trimethyl-pentabromophenoxy-silane

Diethylamine (29.2 g., 0.40 mole) was added slowly with stirring to a solution of trimethylchlorosilane (21.6 g., 0.2 mole) in benzene (100 ml.). An immediate white precipitate formed. The mixture was refluxed for 30 minutes, cooled and filtered to give diethylamine hydrochloride (30.6 g., 99.5%). The filtrate was fractionated through a 20 cm. Vigreux column, giving trimethyl-diethylamino-silane (20.1 g., 69.4%: B.P. 124–127° C.).

Trimethyl-dimethylamino-silane (7.5 g., 0.0517 mole) was added slowly to a mixture of pentabromophenol (25.0 g., 0.051 mole) in benzene (100 ml.) at room temperature, and then refluxed for 2 hours to give a light brown solution. The condenser was replaced by a 20 cm. Vigreux column fitted with a still head, and the mixture was refluxed for a further hour, while the regenerated diethylamine and some benzene was removed. The solvent was removed from the mixture under vacuum to give a pale buff solid identified as trimethyl-pentabromophenoxy-silane, M.P. 193–194° C. (dec.), 10.1 g. (Found: Br, 71.3% $C_9H_9SiOBr_5$ requires: Br, 71.2%) and a pale yellow solid (9.1 g.) M.P. 189° C. identified as pentabromophenol diethylamine quaternary salt (Found: Br, 71.3%, calculated for $C_{10}H_{12}NOBr_5$; Br, 71.2%). The latter compound was prepared in a separate experiment by adding diethylamine to pentabromophenol in benzene (Found: M.P. 189° C.).

$$(CH_3)_3SiCl + 2(C_2H_5)_2NH \rightarrow (CH_3)_3SiN(C_2H_5)_2$$
$$+ (C_2H_5)_2HN_2Cl \downarrow (CH_3)_3SiN(C_2H_5)_2$$
$$+ C_6Br_5OH \rightarrow (CH_3)_3SiOC_6Br_5 + (C_2H_5)_2NH\uparrow$$
$$(C_2H_5)_2NH + C_6Br_5OH \rightarrow (C_2H_5)_2NH_2 + OC_6Br_5$$

EXAMPLE 9

Hexamethyldisilazane (16.1 g. 0.1 mole) (the product of reaction between ammonia and trimethylchlorosilane (this material is commercially available) was treated with pentabromophenol (97.8 g. 0.2 mole) in toluene). The mixture was refluxed for 16 hours during which time ammonia was slowly evolved and dissolved in water traps. Titration showed that more than 70% of the calculated amount of ammonia had been evolved. The toluene solution was filtered and concentrated on a rotary evaporator. On cooling, a pale buff crystalline solid was obtained and identified as trimethyl pentabromophenoxy silane. Yield 34 g. (31%). M.P. 192° (Found: Br, 70.9%. Calculated, for $C_9H_9SiOBr_5$, Br, 71.2%).

As indicated above, the compounds of Formula I impart fire retardant properties to synthetic polymer compositions in which they are incorporated. The proportion of such a compound to be used will depend upon the nature of the polymer (some, for instance, such as polyvinyl chloride, has inherent fire retardancy), the total bromine content of the fire retardant compound used and the degree of fire retardancy of the polymer composition it is wished to obtain, i.e. whether it is desired to obtain a self-extinguishing or a non-burning composition.

Generally it is necessary to add the fire retardant compound in an amount sufficient to provide a bromine content of at least 0.5% by weight, based on the weight of the polymer present in the composition alone, that is without taking into account any fillers, plasticisers, pigments or other additives that may be present in the composition. It is normally preferred to have a higher bromine content of from 5 to 10% by weight of the same basis; it is generally uneconomic to have a bromine content of more than 20% by weight of the polymer.

The effectiveness of the compounds of Formula I as fire retardants can be enhanced by also incorporating one or more of arsenic oxide and sulphide, antimony oxide and sulphide and organic antimonates in the polymer composition. Of these compounds, antimony oxide is preferred and it has been found that at least 1 part by weight of antimony oxide per 8 parts by weight of fire retardant is necessary to increase measurably the fire retardancy of the polymer composition as compared with the same polymer composition in which the fire retardant has been incorporated alone. It is preferred to add antimony oxide in the range of from 0.5 to 1.5:1 by weight of the fire retardant compound. Greater increase in fire retardancy can be achieved with a weight ratio of antimony oxide to fire retardant of 2 or more:1.

The fire retardant compound (an anitimony or arsenic compound, if used) can be incorporated at any suitable stage in the manufacture of the polymer composition. Thus the fire retardant compound may be added to a monomer prior to polymerization or, as may often be more convenient, to an already formed polymer. Other conventional constituents of polymer compositions, such as fillers, plasticisers, pigments and stabiliser, may alo be incorporated.

The compounds of Formula I are particularly suitable for use as fire retardants in polyolefin, for example polyethylene, and polyester compositions.

The following examples showing the use of compounds of Formula I as fire retardants in polymer compositions are given by way of illustration only (all parts are by weight):

EXAMPLE 10

100 parts of "Alkathene" XDG 33 (trademark; a low density polythene sold by I.C.I. Ltd.) in the form of coarse granules were fluxed on a two roll mill, at 155° C. 10 parts of tetra(pentabromophenoxy)-silane were added slowly and mixing was continued for 5 minutes after the last addition. The hot mix was moulded for 2 minutes in a mould preheated to 155° C., pressed at 1000 lbs. per square inch pressure and 155° C. for a further 2 minutes and then cooled for 2 minutes at a pressure of 500 lbs. per square inch.

The moulded material was cut into five specimens measuring 5 inches in length by 0.5 inch in width by 0.125 inch in thickness. The specimens were conditioned for 24 hours at 23° C. before testing for fire retardancy.

The specimens were tested for fire retardancy by A.S.T.M. test procedure D635–56T except that the number of specimens tested was 5 and not 10 as laid down in the test. The flammability classification used is that specified in A.S.T.M.. D635–56T. The results obtained are given in Table I below.

EXAMPLE 11

The procedure of Example 10 was repeated using 5 parts of terta(pentabromophenoxy)-silane and 5 parts of antimony oxide in place of the 10 parts of tetra-pentabromophenoxy)-silane. Specimens were prepared and tested as in Example 10. The results obtained are shown in Table I below.

EXAMPLE 12

The procedure of Examplt 10 was repeated using 10 parts of antimony oxide in addition to the 10 parts of tetra(pentabromophenoxy)-silane. The fire retardancy results obtained are shown in Table I below.

EXAMPLE 13

The procedure of Example 10 was repeated using 20 parts of tetra(pentabromophenoxy)-silane in place of the 10 parts used in Example 10. The fire retardancy results obtained are shown in Table I below.

COMPARATIVE TEST I

A control experiment was carried out using the procedure of Example 10 but with no fire retardant compound being added. The fire retardancy tests were discontinued after 3 specimens had been tested since they were classified as burning. The results obtained are shown in Table I below.

COMPARATIVE TEST II

A control experiment was carried out using the procedure of Example 10 but adding 20 parts of antimony oxide and omitting the 10 parts of tetra(pentabromophenoxy)-silane. The fire retardancy results obtained are shown in Table I below.

EXAMPLE 14

To 100 parts of "Stypol" 40–2417 (trademark; a liquid polyester resin sold by Freeman Chemicals Ltd.) were added 8 parts of tetra(pentabromophenoxy)-silane (which passed 100 mesh BS sieve), 2 parts of benzoyl peroxide and 50 parts of calcium carbonate as filler. These additives were stirred separately into the Stypol 40–2417, in the order in which they are listed, until the mixture was homogenous.

90 parts of fibre glass in the form of 6" x 4" sheets and the homogenous mixture were placed as alternate layers of fibre glass and mixture in a mould preheated to 120° C. and held for 2 minutes under light pressure. The material in the mould was then pressed at a temperature of 120° C. and a pressure of at least 200 lbs. per square inch for 1 minute 40 seconds. The material was maintained under pressure for a total of 2 minutes. The moulding was removed hot and conditioned for 24 hours at room temperature.

The fire retardancy test adopted, a modified version of B.S. 3532:1962, was as follows:

A cut specimen of the fibre glass-containing polyester material measuring 5" long x ½" wide x ⅛" thick was marked at 3 inches from the end to be ignited. The specimen was clamped in a rigid support so that its longitudinal axis was horizontal and its transverse axis was at 45° to the horizontal.

A Bunsen burner was placed centrally under the free end of the specimen so that the burner was 2 inches below the longitudinal axis of the specimen, the temperature of the flame was tested and found to be that specified in B.S. 3532:1962. The flame was removed after 30 seconds and the time taken until the specimen ceased to flame or glow was recorded.

The results obtained are given in Table II below.

EXAMPLE 15

The procedure of Example 14 was repeated but using 4 parts of tetra-pentabromophenoxy)-silane and 4 parts of antimony oxide in place of the 8 parts of tetra(pentabromophenoxy)-silane. The antimony oxide was stirred into the mix after the addition of the benzoyl peroxide and prior to adding the calcium carbonate filter. The fire retardancy results obtained are shown in Table II below.

EXAMPLE 16

The procedure of Example 14 was repeated using 4 parts of methyltris(pentabromophenoxy)-silane and 4 parts of antimony oxide in place of the 8 parts of tetra (pentabromophenoxy)-silane. Specimens were prepared and tested for fire retardancy; the results obtained are shown in Table II below.

EXAMPLE 17

The procedure of Example 14 was repeated using 8 parts of methyl tris(pentabromophenoxy)-silane in place of the 8 parts of tetra(pentabromophenoxy)-silane. The results are shown in Table II below.

COMPARATIVE TEST III

A control experiment was carried out using the procedure of Example 14 but omitting the fire retardant compound. The material was tested as in Example 14 and the results are shown in Table II below.

COMPARATIVE TEST IV

A control experiment was carried out using the procedure of Example 14 but omitting the 8 parts of tetra (pentabromophenoxy)-silane and adding instead 8 parts of antimony oxide. The fire retardancy results obtained are given in Table II below.

EXAMPLE 18

A flexible polyether-urethane foam material was prepared as follows:

Three master batches were prepared having the following compositions:

|  | Masterbatch | | |
|---|---|---|---|
|  | 1 | 2 | 3 |
| Voranol CP 3720, parts | 100 | 100 | 100 |
| Nuocure 28, parts | 6.8 | | |
| Silcocell 380, parts | | | 18 |
| Propamine A, parts | | 6.6 | |

"Voranol" CP 3720 (trademark) is a polyether polyol sold by Dow Chemical Co. (U.K.) Ltd.
"Nuocure" 28 (trademark) is a stannous octoate catalyst sold by Lankro Chemicals Ltd.
"Silcocell" 380 (trademark) is a foam stabiliser sold by I.C.I. Ltd.
"Propamine" A (trademark) is an amine catalyst sold by Lankro Chemicals Ltd.

To 255 parts of Voranol CP 3720 were added 80 parts of tetra(pentabromophenoxy)-silane followed by 12 parts of masterbatch 1, 20 parts masterbatch 2 and 18 parts of masterbatch 3. The mixture was stirred well after each addition.

8.4 parts of water were added to the mixture which was then stirred rapidly for 20 seconds, after which 103 parts of "Hylone" TM (trademark; toluene diisocyanate sold by Du Pont Co. Ltd.) were quickly added. Stirring was continued until the mixture thickened and then the mixture was poured into a suitable mould.

The mixture in the mould foamed and after completion of foaming (about 90 seconds) the mould containing the foamed material was placed in an air circulating oven at 140° C. for 15 minutes to cure the foam, the mould being removed after 2 minutes in the oven.

After curing, ten specimens measuring 6" in length x 2" in width x ½" in depth were prepared from the foam. The specimens so prepared were returned to the air circulating oven and heat aged at 140° C. for 16 hours.

The specimens were tested for fire retardancy in accordance with A.S.T.M. D 1692 59T.

The fire retardancy results obtained are shown in Table III below.

EXAMPLE 19

The procedure of Example 18 was repeated using 40 parts of tetra(pentabromophenoxy)-silane and 40 parts of antimony oxide in place of the 80 parts of tetra(pentabromophenoxy)-silane. Specimens were prepared and tested as for Example 18 and the fire retardancy results are shown in Table III below.

COMPARATIVE TEST V

The procedure of Example 18 was repeated but no fire retardant compound was added. Specimens were tested for fire retardancy in the same manner as that used in Example 18 and the results obtained are shown in Table III below.

TABLE I

|  | Percent fire retardant by weight of resin | Percent bromine w./w. of resin | Percent $Sb_2O_3$ w./w. of resin | Number of specimens tested | Extent of burning in inches | Rate of burning in inches/minute | Flammability classification |
|---|---|---|---|---|---|---|---|
| Example: | | | | | | | |
| 10 | 10 | 8.0 | | 3 | | 0.58 | Burning. |
| 11 | 5 | 4.0 | 5 | 3 | | 0.54 | Do. |
| 12 | 10 | 8.03 | 10 | 3 | | 0.27 | Do. |
| 13 | 20 | 16.0 | | 3 | | 0.38 | Do. |
| Comparative Test: | | | | | | | |
| I | | | | 3 | | 0.76 | Do. |
| II | | | 20 | 3 | | 0.71 | Do. |

TABLE II

|  | Percent fire retardant by weight of resin | Percent bromine by weight of resin | Percent $Sb_2O_3$ by weight of resin | Number of specimens tested | Extent of burning in inches/minute | Extent of burning in inches | Time taken for flame to extinguish |
|---|---|---|---|---|---|---|---|
| Example: | | | | | | | |
| 14 | 8 | 6.4 | | 4 | | 1.4 | 122 |
| 15 | 4 | 3.2 | 4 | 4 | | 0.9 | 34 |
| 16 | 4 | 3.2 | 4 | 4 | | 1.3 | 52 |
| 17 | 8 | 6.4 | | 4 | | 1.5 | 115 |
| Comparative Test: | | | | | | | |
| III | | | | 4 | 0.5 | | |
| IV | | | 8 | 4 | | 1.6 | 118 |

TABLE III

|  | Percent w./w. of fire retardant in final foam | Percent w./w. of bromine in final foam | Percent w./w. of $Sb_2O_3$ in final foam | Extent of burning in inches | Rate of burning in inches/minute | Flammability classification |
|---|---|---|---|---|---|---|
| Example: | | | | | | |
| 18 | 16 | 12.82 | | | 1.6 | Burning. |
| 19 | 8 | 6.4 | 8 | 3.8 | | Self extinguishing. |
| Comparative Test V | | | | | 1.9 | Burning. |

I claim:
1. A process for the preparation of a brominated silane of the formula

$$R_nSi(OC_6Br_5)_{4-n}$$

where R is an alkyl group of from 1 to 6 carbon atoms, and $n$ is 0, 1, 2 or 3, which comprises condensing pentabromophenol with an alkylchlorosilane of the formula $R_nSiCl_{4-n}$, where R and $n$ are as define above, using substantially 4-n moles of pentabromophenol per mol of alkylchlorosilane in the presence of a base selected from the group consisting of dialkylamides, diarylamides and N-aryl-N-alkyl-amides in sufficient quantity to bind all of the HCl formed in the reaction and an inert organic solvent.

2. A process according to claim 1 wherein the base is selected from the group consisting of dimethyl formamide, diethyl formamide, dimethyl acetamide, diethyl acetamide, N-phenyl-N-methyl formamide and diphenylformamide.

3. A process according to claim 1 wherein the base is a dialkyl amide.

4. A process according to claim 3 wherein the base is dimethylformamide.

5. A process according to claim 1 wherein R is a methyl group.

6. A process according to claim 1 wherein the inert solvent is benzene or toluene.

References Cited

UNITED STATES PATENTS 3,546,267   12/1970   Ismail _____ 260—448.8 R
3,492,328   1/1970    Kotzsch _____ 260—448.8 R

OTHER REFERENCES

Bazant et al., "Organosilicon Compounds," vol. 1, Academic Press, New York (1965), pp. 46 and 54.

JAMES E. POER, Primary Examiner

P. F. SHAVER, Assistant Examiner

U.S. Cl. X.R.

252—8.1; 260—448.8 A